(12) United States Patent
Bederson et al.

(10) Patent No.: US 7,650,562 B2
(45) Date of Patent: *Jan. 19, 2010

(54) METHODS AND SYSTEMS FOR INCREMENTALLY CHANGING TEXT REPRESENTATION

(75) Inventors: Benjamin B. Bederson, University Park, MD (US); Lance E. Good, Cupertino, CA (US); Mark J. Stefik, Portola Valley, CA (US)

(73) Assignee: Xerox Corporation, Norwalk, CT (US)

( * ) Notice: Subject to any disclaimer, the term of this patent is extended or adjusted under 35 U.S.C. 154(b) by 755 days.

This patent is subject to a terminal disclaimer.

(21) Appl. No.: 10/369,613

(22) Filed: Feb. 21, 2003

(65) Prior Publication Data

US 2003/0159107 A1 Aug. 21, 2003

Related U.S. Application Data

(60) Provisional application No. 60/357,850, filed on Feb. 21, 2002.

(51) Int. Cl.
*G06F 17/00* (2006.01)

(52) U.S. Cl. ............... 715/200; 715/255; 715/256

(58) Field of Classification Search ......... 715/529–531, 715/520, 720, 717–718, 732, 861, 200, 201, 715/203, 256, 730, 254, 255; 345/473–475
See application file for complete search history.

(56) References Cited

U.S. PATENT DOCUMENTS

| | | | |
|---|---|---|---|
| 5,077,668 A | 12/1991 | Doi | |
| 5,257,186 A | 10/1993 | Ukita et al. | |
| 5,278,980 A | 1/1994 | Pedersen et al. | |
| 5,317,507 A * | 5/1994 | Gallant | 715/260 |
| 5,339,391 A | 8/1994 | Wroblewski et al. | |
| 5,384,703 A | 1/1995 | Withgott et al. | |
| 5,479,600 A | 12/1995 | Wroblewski et al. | |
| 5,634,064 A * | 5/1997 | Warnock et al. | 715/513 |
| 5,689,716 A | 11/1997 | Chen | |
| 5,745,602 A | 4/1998 | Chen et al. | |
| 5,778,397 A | 7/1998 | Kupiec et al. | |
| 5,838,323 A | 11/1998 | Rose et al. | |
| 5,867,164 A | 2/1999 | Bornstein et al. | |
| 5,918,240 A | 6/1999 | Kupiec et al. | |
| 5,924,108 A | 7/1999 | Fein et al. | |
| 5,978,820 A | 11/1999 | Mase et al. | |
| 5,995,095 A * | 11/1999 | Ratakonda | 715/500.1 |
| 6,104,990 A * | 8/2000 | Chaney et al. | 704/9 |

(Continued)

OTHER PUBLICATIONS

"Dynamic Document Presentation", Boguraev et al., published Apr. 1998, pp. 1-10.*

(Continued)

*Primary Examiner*—Thu Huynh
(74) *Attorney, Agent, or Firm*—Oliff & Berridge, PLC

(57) ABSTRACT

To reduce required display space, a text segment is reduced in size by successively eliminating portions of the text segment in an animated fashion. The reduction is thus visually represented in a way that maintains recognizability of the text segment, even if the final representation of the text does not carry a full meaning and/or is not independently comprehensible, because of the impression left in the mind of the user by the animated reduction of the text segment. The reduction may include reducing a size of text of the text segment and/or a spacing between characters of the text segment.

16 Claims, 8 Drawing Sheets

U.S. PATENT DOCUMENTS

| | | | |
|---|---|---|---|
| 6,185,592 B1 | 2/2001 | Boguraev et al. | |
| 6,243,093 B1 | 6/2001 | Czerwinski et al. | |
| 6,289,304 B1 | 9/2001 | Grefenstette | |
| 6,401,086 B1* | 6/2002 | Bruckner | 707/4 |
| 6,486,896 B1* | 11/2002 | Ubillos | 715/784 |
| 6,584,479 B2* | 6/2003 | Chang et al. | 715/512 |
| 2002/0059367 A1* | 5/2002 | Romero et al. | 709/203 |
| 2003/0110450 A1* | 6/2003 | Sakai | 715/529 |
| 2004/0205457 A1* | 10/2004 | Bent et al. | 715/500 |

OTHER PUBLICATIONS

Microsoft PowerPoint 2002 (hereinafter PowerPoint), copyright 2001, pp. 1-64.*

Microsoft PowerPoint 2002 (hereinafter PowerPoint), copyright 2001, pp. 1-77.*

E. Ayers et al. , "Using Graphic History in Browsing the World Wide Web", The 4th International World Wide Web Conference, www._w3.org/Conferences/WWW4/Program_4.html, Dec. 11-14, 1996.

B. Bederson et al., Jazz: An Extensible Zoomable User Interface Graphics Toolkit in Java., Proceedings of UIST 2000, pp. 171-180, (2000).

T. Berlage, "A Selective Undo Mechanism for Graphical user Interfaces Based on Command Objects", ACM Transactions on Computer-Human Interaction, vol. 1, No. 3, pp. 269-294, 1994.

R. Gandhi et al. , "Domain Name Based Visualization of Web Histories in a Zoomable User Interface", In Proceedings of 11th International Workshop on Database and Expert Systems Applications—Second International Workshop on Web-Based Information Visualization (WebVis 2000), IEEE Computer Society, pp. 591-598, 2000.

R. Hightower et al. , "PadPrints: Graphical Multiscale Web Histories", Proceedings of UIST, pp. 121-122, 1998.

W. Hill et al., "Edit Wear and Read Wear", Proceedings of CHI '92, pp. 3-9.

D. Kurlander et al., "Editable Graphical Histories", IEEE 1988 Workshop on Visual Languages, 416-423, 1988.

B. Myers et al., "A Multi-View Intelligent Editor for Digital Video Libraries", Intelligent Editor for Digital Video Libraries, submitted for publication, pp. 1-10, 2001.

C. Ahlberg et al., "The Alphaslider: A Compact and Rapid Selector", Proceedings of CHI, pp. 365-371, 1994.

Y. Ayatsuka et al., "Popup Vernier: a Tool for Sub-pixel-pitch Dragging with Smooth Mode Transition", Proceedings of UIST, pp. 39-48, 1998.

T. Ball et al., "Software Visualization in the Large", IEEE Computer, vol. 29, No. 4, pp. 33-43, 1996.

B. Bederson et al. , "Pad++: A Zoomable Graphical Sketchpad For Exploring Alternate Interface Physics", Journal of Visual Languages and Computing, vol. 7, pp. 3-31, 1996.

D. Byrd, "A Scrollbar-based Visualization for Document Navigation", Proceedings of the fourth ACM conference on Digital Libraries, pp. 122-129, 1999.

D. Cox et al., "The Usability of Transparent Overview Layers", Proceedings of CHI, pp. 301-302, 1998.

A. Dieberger et al., "A City Metaphor to Support Navigation in Complex Information Spaces", Journal of Visual Languages and Computing, vol. 9, pp. 597-622, 1998.

G. Furnas, "Generalized Fisheye Views", Proceedings of CHI, pp. 16-23, 1986.

C. Manning et al., "Dirty Hands", Foundations of Statistical Natural Language Processing, MIT Press, pp. 31-34, 1999.

M. Hearst, "TileBars: Visualization of Term Distribution Information in Full Text Information Access." Proceedings of CHI '95, pp. 59-66, 1995.

T. Masui, "LensBar—Visualization for Browsing and Filtering Large Lists of Data", Proceedings of Info Vis, 1998.

S. McCrickard et al., "Beyond the Scrollbar: An Evolution and Evaluation of Alternative Navigation Techniques", Proceedings of the IEEE Symposium on Visual Languages, pp. 270-277, 1999.

S. Pook et al., "Context and Interaction in Zoomable User Interfaces", Proceedings of the ACM Conference on Advanced, Visual Interfaces, pp. 227-231 & 317, 2000.

F. Shipman et al., "Beyond Location: Hypertext Workspaces and Non-Linear Views", Proceedings of the Tenth ACM Conference on Hypertext and Hypermedia, pp. 121-130, 1999.

B. Shneiderman, "Designing the User Interface: Strategies for Effective Human Computer Interaction", Addison-Wesley, pp. 451-452, 1998.

R. Spence et al., "Data Base Navigation: An Office Environment for the Professional", Behavior and Information Technology, pp. 43-54, 1982.

G. Robertson et al., "The Document Lens", Proceedings of UIST'93, pp. 101-108, 1993.

B. Bederson et al., "Implementing a Zooming User Interface: Experience Buidling Pad++", Software: Practice and Experience, vol. 28, No. 10, pp. 1101-1135, 1998.

S. Card et al., "Degree-of-Interest Trees: A Component of an Attention-Responsive User Interface", submitted to CHI, 2002.

D. Nation et al., "Browse Hierarchical Data with the Degree of Interest Tree", submitted to CHI, 2002.

K. Perlin et al., "Pad: An Alternative Approach to the Computer Interface", Proceedings of 1993 ACM SIGGRAPH Conference, pp. 57-64, 1993.

O. Buyukkokten et al., "Accordion Summarization for End-Game Browsing on PDAs and Cellular Phones", CHI 2001, pp. 213-220, 2001.

M. Czerwinski et al., "Visualizing Implicit Queries For Information Management and Retrieval", Proceedings of CHI'99, pp. 560-567, 1999.

D. Hederson, Jr. et al., "Rooms: The Use of Multiple Virtual Workspaces to Reduce Space Contention in a Window-Based Graphical User Interface", ACM Transactions on Grpahics, vol. 5, No. 3, pp. 211-243, 1986.

D. Jerding et al., "The Information Mural: A Technique for Displaying and Navigating Large Information Spaces", IEEE Transactions on Visualization and Computer Graphics, vol. 4, No. 3, pp. 257-271, 1998.

T. Malone, How Do People Organize Their Desks? Implications for the Design of Office Information Systems, ACM Transactions on Office Information Systems, vol. 1, No. 1, pp. 99-112, 1983.

M. Stefik et al., Beyond the Chalkboard: Computer Support for Collaboration and Problem Solving in Meetings, Communications of the ACM, vol. 30, No. 1, pp. 32-47, 1987.

A. Woodruff et al., "Using Thumbnails to Search the Web", Conference Proceedings of CHI 2001, vol. 3, Issue 1, pp. 198-205, 552, 2001.

W. Estes, Classification and Cognition, New York: Oxford University Press, pp. 32-87, 1994.

K. Knight et al., "Statistics-Based Summarization—Step One: Sentence Compression", American Association for Artificial Intelligence, 2000.

M. Mills et al., "A Magnifier Tool for Video Data", CHI '92, pp. 93-98, 1992.

Co-pending U.S. Appl. No. 10/369,614 to Benjamin Bederson et al.., filed Feb. 21, 2003, entitled Method and System for Incrementally Changing Text Representation.

Co-pending U.S. Appl. No. 10/369,612 to Lance E. Good et al.., filed Feb. 21, 2003, entitled Methods and Systems for Navigating a Workspace.

Co-pending U.S. Appl. No. 10/369,624 to Lance E. Good et al., filed Feb. 21, 2003, entitled Methods and Systems for Interactive Classification of Objects.

Co-pending U.S. Appl. No. 10/369,617 to Lance E. Good et al.., filed Feb. 21, 2003, entitled Methods and Systems for Indicating Invisible Contents of Workspace.

* cited by examiner

One in six traffic fatalities is a pedestrian — 100
One in six traffic fatalities is a pedestrian
One in six traffic fatalities is a pedestrian
One in six traffic fatalities is a pedestrian
One in six traffic fatalities is a pedestrian — 110

FIG. 1

One in six traffic fatalities is a pedestrian
One in six traffic fatalities is a pedestrian
One in six traffic fatalities
One in six traffic fatalities
One in six
One in six
One

FIG. 2

| WORD | S OR P | MODIFIER? | LENGTH | ORDER | FREQ |
|---|---|---|---|---|---|
| The | s | | 3 | 1 | -- |
| plasma | s | | 5 | 2 | 1 |
| membrane | s | | 8 | 3 | 2 |
| is | p | | 2 | 4 | -- |
| the | p | | 3 | 5 | -- |
| edge | p | | 4 | 6 | 1 |
| of | p | + | 2 | 7 | -- |
| life | p | + | 4 | 8 | 2 |
| the | p | | 3 | 9 | -- |
| boundary | p | | 8 | 10 | 1 |
| that | p | + | 4 | 11 | -- |
| separates | p | + | 9 | 12 | 1 |
| the | p | + | 3 | 13 | -- |
| living | p | + | 6 | 14 | 1 |
| cell | p | + | 4 | 15 | 1 |
| from | p | + | 4 | 16 | -- |
| its | p | + | 3 | 17 | -- |
| nonliving | p | + | 9 | 18 | 1 |
| surroundings | p | + | 13 | 19 | 1 |

*FIG. 4*

| WORD | S OR P | MODIFIER? | LENGTH | FREQ | SCORE |
|---|---|---|---|---|---|
| The | 5 | | -5 | | 0 |
| plasma | 5 | | 6 | | 11 |
| membrane | 5 | | 6 | 2 | 13 |
| is | 2 | | -5 | | -3 |
| the | 2 | | -5 | | -3 |
| edge | 2 | | 4 | | 6 |
| of | 2 | -5 | -5 | | -8 |
| life | 2 | -5 | 4 | 2 | 3 |
| the | 2 | | -5 | | -3 |
| boundary | 2 | | 6 | | 8 |
| that | 2 | -5 | 4 | | 1 |
| separates | 2 | -5 | 6 | | 3 |
| the | 2 | -5 | -5 | | -8 |
| living | 2 | -5 | -5 | | -8 |
| cell | 2 | -5 | 4 | | 1 |
| from | 2 | -5 | 4 | | -8 |
| its | 2 | -5 | -5 | | -8 |
| nonliving | 2 | -5 | 6 | | 3 |
| surroundings | 2 | -5 | 6 | | 3 |

FIG. 5

600 {
The plasma membrane is the edge of life, the boundary that separates the living cell from its nonliving surroundings. One of the earliest episodes in the evolution of life may have been the formation of a membrane that could enclose a solution of different composition from the surrounding solution, while still permitting the selective uptake of nutrients and elimination of waste products.

610 { The plasma membrane is the edge of life, the boundary that separates the living cell from its nonliving surroundings. One of 620 { the earliest episodes in the evolution of life may have been the formation of a membrane that could enclose a solution of different composition from the surrounding solution, while still permitting the selective uptake of nutrients and elimination of waste products.

630 { The plasma membrane is the edge of life, the boundary that separates the living cell from its nonliving surroundings.

The plasma membrane is the edge of life boundary that separates the living cell from its nonliving surroundings.

The plasma membrane edge
life boundary separates
nonliving

The plasma membrane edge
life boundary separates
nonliving plasma membrane
edge life plasma membrane
edge plasma edge plasma edge plasma

*FIG. 7*

METHODS AND SYSTEMS FOR INCREMENTALLY CHANGING TEXT REPRESENTATION

This non-provisional application claims the benefit of U.S. Provisional Application No. 60/357,850, entitled "Zooming Interfaces For Sensemaking, Visualization, and Navigation" which was filed on Feb. 21, 2002, and is hereby incorporated by reference in its entirety.

RELATED APPLICATIONS

The following related U.S. patent applications are hereby incorporated herein by reference in their entirety:

U.S. patent application Ser. No. 10/371,017, filed Feb. 21, 2003, entitled "System and Method for Interaction of Graphical Objects on a Computer Controlled System";

U.S. patent application Ser. No. 10/371,263, filed Feb. 21, 2003, entitled "System and Method for Moving Graphical Objects on a Computer Controlled System";

U.S. patent application Ser. No. 10/369,614. filed Feb. 21, 2003, entitled "Method and System for Incrementally Changing Text Representation";

U.S. patent application Ser. No. 10/369,612, filed Feb. 21, 2003, entitled "Methods and Systems for Navigating a Workspace";

U.S. patent application Ser. No. 10/369,624, filed Feb. 21, 2003, entitled "Methods and Systems for Interactive Classification of Objects"; and U.S. patent application Ser. No. 10/369,617, filed Feb. 21, 2003, entitled "Methods and Systems for Indicating Invisible Contents of Workspace".

BACKGROUND OF THE INVENTION

1. Field of Invention

This invention relates to a method and system for incremental multi-level change of text.

2. Description of Related Art

As the amount of information in our lives continues to grow, people want new and effective ways of finding and using it. "Sensemaking" is a process of gathering, understanding, and using information for a purpose. Sensemaking tasks often involve searching for relevant documents and then extracting and reformulating information for better understanding and utilization. Making a report is an example of a sensemaking task. A sensemaker performing this task has many interrelated and possibly interwoven subtasks. One way or another, a sensemaker gathers information, identifies and extracts portions of it, organizes these for efficient use, and ultimately incorporates the information in a work product with the required logical and rhetorical structure.

In difficult sensemaking tasks, sensemakers often employ intermediate representations to make the information available for repeated manipulation and visualization. Paper is often the medium of choice for external representations. For example, note cards may be used to keep short notes on a subject. The cards can be organized in groups, sorted, and progressively reorganized as more information is gathered.

At some phases of the work, sensemakers may spread their note cards out on a large table for ready access and overview. Small groups doing sensemaking, brainstorming, and design tasks often put note card-sized memos on large white boards or the like when organizing and sharing information.

For many sensemaking tasks, text is the main representation used to carry information. Although displays vary considerably in size—from watch and handheld displays, to desktop displays, to wall-sized displays, for example—there is always competition for space. When these tasks are performed on a computer, even high-resolution desktop displays can show only one or two pages of text. To put more textual information objects on a display of fixed size requires some way of reducing the required amount of space—at least temporarily—for each of the textual information objects.

U.S. Pat. No. 5,867,164 to Bornstein et al. discloses an interactive document summarization system that allows the user to control how much of the original document is included in the summary. In this system, the summary of the document may be narrowed down to only one sentence, which facilitates rapid review of documents.

In summarization, the goal of representation reduction is to identify the most salient information and to create more meaningful representations for text objects as they are given reduced space. The reduced representation for summarization is intended as a stand-in for the longer text and should be comprehensible, correct, salient, and representative. In other words, such summarization techniques require that text need carry a full meaning and need to be comprehensible or strictly correct. Therefore, the summarized information still occupies significant areas of the workspace.

There is another type of technique called semantic text zooming. In semantic text zooming, when text is visibly small it appears only as a title, and as the user zooms in, the text expands to include an abstract. Further zooming reveals first an outline with short text descriptions, then finally the full text. An example of semantic text zooming is disclosed by Perlin et al. (Perlin and Fox (1993). Pad: An Alternative Approach to the Computer Interface, Proceedings of 1993 ACM SIGGRAPH Conference, 57-64). However, such semantic text zooming requires pre-defined levels of abstraction.

SUMMARY OF THE INVENTION

In this invention, unlike prior art systems, text need not maintain "truth," e.g., it need not carry a full meaning and need not be comprehensible or strictly correct. Instead, it merely needs to be visually recognizable. Recognizability is supported by the combination of selecting distinguishable words and/or by the use of animated visual effects.

One of the problems in effectively representing sensemaking is space. For example, most computer displays are only large enough to show one or two pages of text at a readable size. This limitation is like telling sensemakers using note cards or the like that they can reorganize and reuse the material however they want, but that they must keep all their cards stacked on no more than one or two sheets of paper, or telling sensemakers using electronic media that they can scroll, pan, zoom and/or turn pages, but that they can never see more than one or two pages at once. Unlike tabletops and whiteboards, which have a large space and in which space is immediately physically and visually accessible, this limitation is quite significant in its effects on external cognition using computer displays, projectors and the like.

For many sensemaking tasks, text is the main representation used to carry information. To put more textual information objects on a display of fixed size requires some way of reducing the required amount of space—at least temporarily—for each of the information objects. One way to reduce the amount of the text object is to simply shrink the size of text. For example, as shown in FIG. 1, the text in a sentence 100 may be minimized, reducing the text size of the sentence 110. However, even though sentence 110 occupies only about ⅓ of the space required by the sentence 100, this strategy rapidly sacrifices the legibility of the object. FIG. 2 shows another example in which the amount of display space is reduced by reducing the length of a sentence. In this example, the reduction is accomplished by simply picking the first few words, and discarding the others. This may not lead to particularly meaningful representations.

Another possible technique is to replace an image of the text with a fixed representation, such as an iconic representation, representing a text file or folder. This technique has the following problems. With such a fixed representation, there is no representation of content. Although some systems using this technique offer a user an ability to provide a title for an icon, the title must be created manually. In addition, there is a rigid trade-off of representation versus size. Because there are only two sizes in the representation (i.e., either the text at full size or the icon at small size), there is no range of intermediate representations to provide intermediate options for trading off recognizability, or the amount of useful information conveyed, against the amount of available space.

As another possible technique, in order to reduce the amount of space that a text object, such as a multiple sentence object, occupies, the sentences can be summarized so that the number of letters can be reduced while the meaning of the sentences is still maintained. In summarization, the general goal is to identify the most salient information. A reduced representation for summarization is intended as a substitute for the longer text and should be comprehensible, correct, salient, and representative.

The summarizing techniques described above are typically not adequate for sensemaking since the summary of a given sentence still covers a considerable area on a display.

This invention takes advantage of the fact that, in sensemaking, text need not always carry a full meaning independently, e.g., there is a weaker requirement of truth, and that text need not always be understandable out of context or strictly correct according to grammar or spelling. It can be enough if the "summary" remains recognizable as it shrinks, without requiring that the smaller form try to carry the entire meaning.

Methods and systems for dynamically incrementally changing text representation according to this invention reduce a number of original sentences to a predetermined number of sentences (e.g., one sentence), reduce a number of words in the sentence to a predetermined number of words (e.g., one word), and may reduce a number of letters in the predetermined number of words. These steps need not happen in order and can be combined freely. Furthermore, the above-described steps may be reversed to retrieve the original sentence or sentences from the reduced representation. The change in representation may occur via one or more intermediate representations, and may be automatic in the sense that, once started, the representations are successively displayed without requiring input from a user.

Text size reduction and/or reduction of the spacing between characters may be combined with the textual content reduction to produce a better representation for an object for a given size constraint. Visualization effects such as animation may also be used to present the sequence of the reduction and/or enlargement.

BRIEF DESCRIPTION OF THE DRAWINGS

Various exemplary embodiments of the systems and methods of this invention will be described in detail, with reference to the following figures, wherein:

FIG. 1 illustrates an example in which the magnification of a sentence is simply reduced;

FIG. 2 illustrates another example in which a sentence is shortened to the first word by dropping words from the end of the sentence;

FIG. 4 shows a table in which a sentence is analyzed based on an exemplary algorithm used according to this invention;

FIG. 5 shows a table in which a score is calculated based on the analysis shown in FIG. 4;

FIG. 7 illustrates another example of visualization used to present an incremental text representation according to this invention;

DETAILED DESCRIPTION OF PREFERRED EMBODIMENTS

Text reduction according to the invention creates a sequence of textual representations for a text object by combining textual content reduction with text size and/or spacing reduction, and/or with animation, as the area allocated to the text object decreases. An object of this invention is to increase or maintain the recognizability of information represented by the text as the size of the object is decreased. Animated transitions may be used to provide continuity during the changing size constraints (i.e., shrinking or enlarging the object) as the representation changes. Exemplary approaches for changing representations are described below.

First, when a passage of text under consideration has a plurality of sentences, in order to reduce the amount of text area, the sentences may be reduced to a smaller set of sentences, until there is only one sentence, for example. This sentence is treated as a set of words. The set of words may be gradually reduced to increasingly smaller sets of words. At each level of text reduction, the space may be reduced by a predetermined amount, such as about 50%. This process may be repeated until there is a predetermined number of words, such as one word. This word may be treated as a set of letters. The set of letters may be reduced to increasingly smaller sets of letters until only a few letters, possibly one letter, remain.

In addition to reducing the content of the text object, the text size, e.g., the font size, of the object, and/or the spacing between characters, can also be reduced. Because the content can only be reduced in discrete increments such as letters, words, lines, and sentences, the best representation for a text object may combine both content reduction and font and/or spacing reduction in order to fit a given size constraint.

Figure 3:
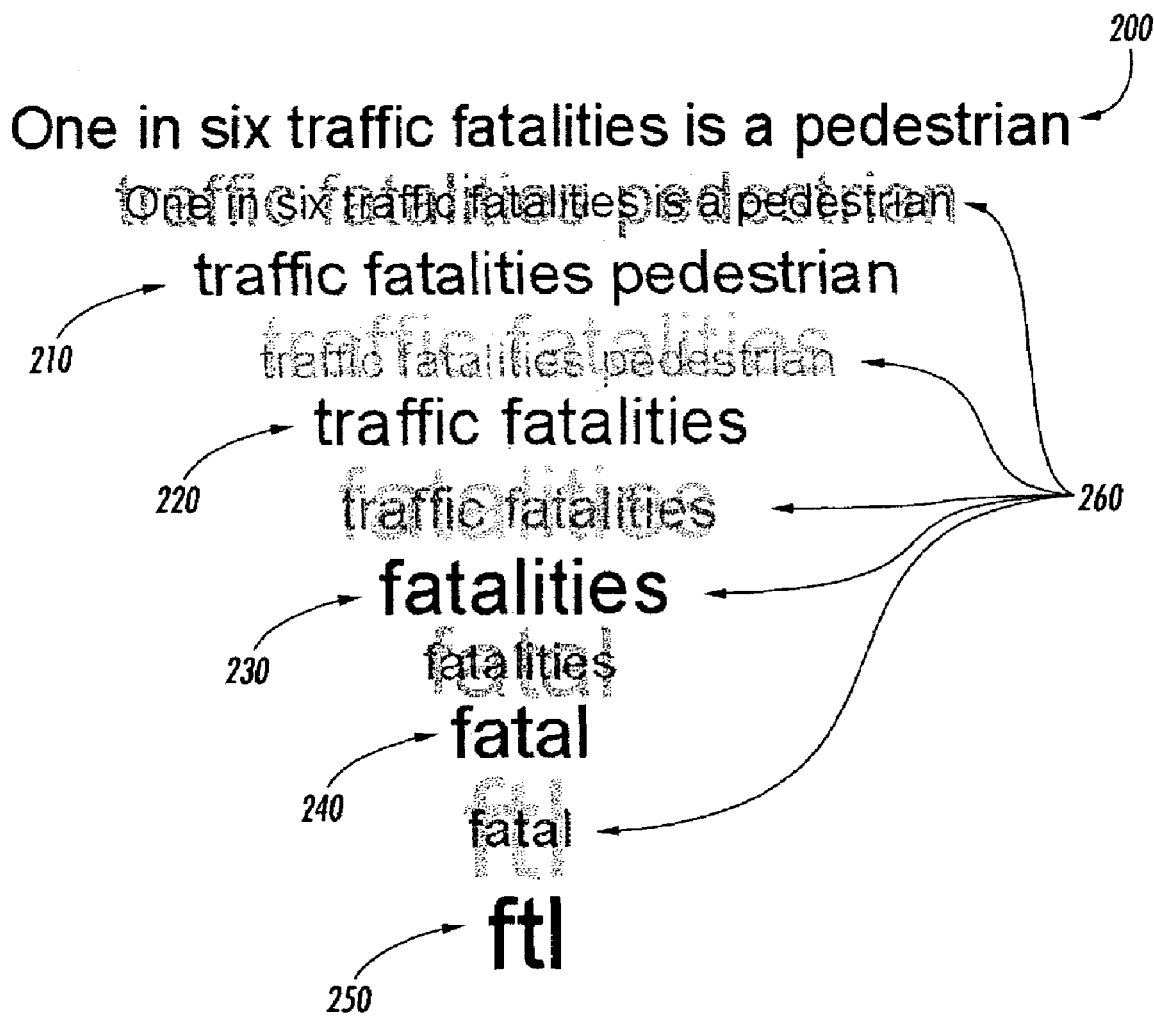
FIG. 3 illustrates an example of incremental text representation according to this invention.

FIG. 3 demonstrates an example of an incremental reduction of text. In this example, an original text object 200 has eight words. Each successive stage of the representation reduces the number of words or letters that are displayed, such that the area required for displaying the reduced text becomes, for example, approximately 50% of the area required before the reduction.

For example, the second representation 210 displays three words, "traffic," "fatalities" and "pedestrian," that are identified as being more important than others, e.g., by the scoring methods described below. The representation 210 thus requires approximately 50% of the original text object 200. The third representation 220 displays two words, "traffic" and "fatalities," and the fourth representation 230 displays only one word, "fatalities." Then, the representation 230 is replaced with a word 240, "fatal," that is a stem of "fatalities." The last representation 250 in the sequence removes some or all of the vowels from "fatal," resulting in the characters "ftl."

During reduction of text objects, each text object could shrink continuously in font size until it is the smallest legible letter size within the allocated space, before the number of words used in the text objects starts to reduce, or while it is being reduced. For example, with a display size of 1024×768 pixels, when the text size becomes the smallest legible text size, which may be an 8-point font, the text objects may shift down to the next level of representation using an animated transition. Moreover, spaces between letters or other types of formatting may be decreased or removed prior to or during the reduction of the text object area.

In a zooming context, transitions between representations may be animated to create a sense of continuity of identity. For example, each representation may "morph" into the next one. In the example shown in FIG. 3, a cross dissolve 260, which dissolves one object while making another object appear, is used to animate each transition.

In the example described above, animation is used to show the transitions. However, the animation may be omitted. As another option, a user may be able to control the level of reduction. As yet another option, multiple steps of reduction can be independently initiated by the user by, for example, clicking on a text object separately for each reduction.

The visual presentation (e.g. color, font, background, etc.) of the text may be altered in the final representation, and/or any representation between the first and final representations may be differentiated from the visual presentation of the original sentence, to indicate that the representation has been reduced. Similarly, a graphic symbol, such as an icon or sign, may be used to indicate that the text has been reduced.

Another aspect of the combination of content reduction and font reduction is that as the space allocated to a particular information object is reduced, it may become impossible to present any reasonable representation at all. One response to this is to shift to higher levels of aggregation for the summary. Thus, instead of presenting a reduced representation ("summary") for each object in a group, a reduced representation standing for the entire group can be produced.

Similarly, when reduced representations are created for multiple objects at once, it can be visually disturbing to have different font sizes across multiple objects. As a result, it may be important to coordinate the font size reduction across all represented objects.

Exemplary details of how content may be reduced are described below. In the following example, it is assumed that the starting point for representation reduction is a relatively small section of text, such as a paragraph. The determination of the section of the text may be done in various ways. For example, the section may be a paragraph or a predetermined number of sentences from a paragraph. The section of the text may be determined by a user by, for example, manually selecting it from a group of sentences. The original text may be electronic data, such as an electronic document prepared using word processing software or the like, text created using web page creation software or the like, or a document digitized by scanning or the like. The original text may also have been entered manually by the user.

The representation reduction creates a sequence of text representations, each succeeding representation reducing the display space requirements of the preceding representation by, for example, approximately 50%. At any point in the process, the reduction of a given representation may be based on various criteria, as described in detail below. Reduction occurs by applying these criteria, and determining the best of the resulting representation that meets display size requirements of the next level of reduction. The process then repeats until the representation is as small as desired—maybe a single word, word stem, or character.

First, the text objects are parsed into sentences. Sentences may be given scores which take into account sentence length and/or order. A simple version of an exemplary algorithm gives priority to topic or beginning sentences and eliminates sentences from the end at each level until approximately half of the text is eliminated.

Next, one or more analyses may be performed on the representative sentences when or before word selection begins. Words in the sentence may be labeled to indicate whether they are in the subject or the predicate. Words may also be labeled to indicate whether or not they are modifiers or part of a modifying phrase. In addition, the length (number of letters) of each word may be obtained. The order number of each word in the sentence may also be obtained. In addition, the word frequency of each word in the original text may be obtained (for example, the word frequency is "2" if the word appears twice in the original text).

Scores may be assigned to words, and subsets of words that have a high score may be searched. Any subset of words that is longer than, for example, 55% of the previous representation may be eliminated unless it consists of only one word. As will be apparent to those skilled in the art, the assignment of scores to words can be done in many different ways. Examples of criteria for assigning scores may be:

Words that are in the subject may be favored (i.e., given priority to be retained) over words in the predicate.

Words that are in modifying phrases may be penalized (i.e., given priority to be removed).

Words having equal to or more than a predetermined length may be favored, and words of three letters or less, for example, may be eliminated.

Words that appear more than once in the original may be favored over words that appear only once.

Main clauses may be favored over subordinate clauses.

Heads of constituents (e.g., noun phrases) may be favored.

Relation to other text objects may be analyzed. For example, words could be selected which make a particular text object distinguishable from other text objects that are in view (e.g., words that are boldfaced, underlined or highlighted may be favored).

Words appearing early in a sentence, for example, may be favored over words appearing late in the sentence.

Stop words (e.g. words that have been chosen to be ignored, such as "of," "and," "in," etc.) may be eliminated.

Capitalized words may be favored over lowercase words.

Occurrence of certain letters in a word may be considered. For example, words could get extra points if they include letters that are rarely used, such as "Z," "X" or "Q."

Words may be selected based on user-specified preferences.

Below are some examples of possible rules for scoring words:

A word gets 5 points if it is in the subject, 2 points if it is in the predicate.

Words in modifying phrases get penalized 5 points.

The number of letters in a word may be used as a score. A word is penalized 5 points if it has equal to or less than 3 letters. Otherwise, a word gets a point for each letter, up to 6 points.

Words whose length is greater than 3 letters get an additional point for every time that they appear in the original text object.

The reduction of letters of a word may begin when there is only a predetermined number of words remaining, e.g., one word. One or more operations may be performed on the word for reducing the number of letters in the word. At each stage of reduction, the number of letters may be reduced by about half (e.g., approximately 50%). This is repeated until there is just a predetermined number of letters, e.g., one letter, left in the word. Assignment of scores to letters can be done in many different ways. Below are some examples of basic criteria for reducing the number of letters in a word:

If a word has a known abbreviation or stem, that may be used.

Double letters may be eliminated.

Consonants may be favored over vowels.

Idiosyncratic spellings, such as "Xing" for "Crossing", may be used.

It should be appreciated that some words may be reduced in length before any words are eliminated.

An example of incremental multi-level reduction of text is described below in conjunction with the following sentences:

The plasma membrane is the edge of life, the boundary that separates the living cell from its nonliving surroundings. One of the earliest episodes in the evolution of life may have been the formation of a membrane that could enclose a solution of different composition from the surrounding solution, while still permitting the selective uptake of nutrients and elimination of waste products.

A selection is made from among the sentences, which may be based on various factors in any desired combination. For example, the first sentence may always be selected. As another example, e.g., in a case where the first sentence does not have a high score because the first sentence is short or has only stop words, for example, the second sentence or another sentence may be selected. In the present example, it is assumed that the first sentence is selected by virtue of being first, and that the second sentence is eliminated. Therefore, the following sentence remains:

The plasma membrane is the edge of life, the boundary that separates the living cell from its nonliving surroundings.

Next, the selected sentence is analyzed as shown in FIGS. 4 and 5. FIG. 4 shows a table 300 according to an exemplary embodiment in which each word in the sentence is identified and analyzed. In FIG. 4, column 310 lists each word in the sentence, and column 320 indicates whether each word is in the subject or in the predicate. Column 330 indicates whether each word is a modifier. Column 340 shows the number of letters of each word. Column 350 indicates the order number of each word, i.e., in what order each word appears in the sentence. Column 360 shows the frequency of appearance of each word in the original document. It will be appreciated by those skilled in the art that the factors represented in columns 320, 330, 340 and 360 are simply examples of factors that may be used in the comparative analysis of the words in the sentences, and that there may be more or fewer factors used in the analysis.

In the analysis shown in FIG. 4, the word "membrane," for example, is determined to be in the subject and to not be a modifier. It has eight letters and appears third in the sentence. The word appears twice in the original paragraph.

FIG. 5 shows a table 400 in which a score is calculated for each word based on the information in the table 300 shown in FIG. 4. That is, in FIG. 5, in column 410, the subject words are assigned 5 points, for example, while the predicate words are assigned 2 points, since a subject word typically has more importance than a predicate word in terms of conveying a main idea. In column 420, 5 points are deducted from each modifier word, for example. In column 430, if a word has more than 3 letters, it is given a point for each letter, up to a maximum of 6 points, while 5 points are deducted if the word has 3 letters or less, for example. For instance, the word "plasma" receives 6 points, while the word "The" is penalized 5 points. In column 440, if a word appears more than once in the original paragraph, the word receives a point for each appearance. Column 450 indicates the total score of each word.

It will be appreciated by those skilled in the art that the tables shown in FIGS. 4 and 5 are used for illustrative purposes only, and there may be only one stage, or more than two stages, that performs calculations of tables shown in FIGS. 4 and 5.

The first reduction of words may be targeted to produce a string of about half, for example, of the number of the letters in the sentence. In this example, because the original sentence consists of 117 characters, including spaces, the reduced string should produce a string of no more than 58 characters, including spaces. Therefore, the top two candidates of different combinations may include:

Plasma membrane edge life boundary nonliving surroundings (length 57, score 47)

Plasma membrane edge life boundary separates nonliving (length 54, score 47)

In the first iteration, the first candidate is selected although either candidate could be accepted because of the equal scores. Various rules could be employed here that would choose either the longer or shorter of the two representations. The rules could also be employed to choose between the representations based on the available representations in later iterations.

The second iteration reduces the length to no longer than 27 letters, in this example. Therefore, the candidates after the second iteration become as follows:

Plasma membrane boundary (length 24, score 34)

Plasma membrane edge life (length 25, score 32)

After the second iteration, the second candidate is selected because it has a lower score. The third iteration reduces the length to no longer than 13 characters, in this example. Therefore, the candidates after the third iteration become as follows:

Plasma edge (length 11, score 17)

Membrane edge (length 13, score 19)

The last iteration reduces the length to one word having, for example, the higher score. Therefore, the word "membrane" is selected since its individual score exceeds the individual score of the word "plasma."

After the word is selected, the word is further shortened by, for example, removing vowels and eliminating any double letters. Therefore, the word "membrane" becomes "mbrn."

In the above example, two candidates were obtained at each step. However, it will be apparent to those skilled in the art that the number of candidates may be one or more than two. In addition, if there are two or more candidates, a selection of the candidate may be performed automatically or manually by the user at any point during the reduction process.

Furthermore, in the above embodiment, a candidate having a longer length was selected. However, it will be appreciated that a candidate having a shorter length or higher or lower score may be selected instead, for example, based on a look-ahead to the quality of candidates in later iterations of reduction.

The above-described text zooming technique involves transitioning between levels of reduction in representation. As a result, moving from one level to another introduces the possibility for different types of transitions. A large number of types of transitions already exist for moving between image displays. Some examples include dissolves, wipes, page peels, slides, masks, stretches, and irises, and any of these types of transition may be used. Two other examples of transitions applied in a text zooming setting are the cross-dissolve and the cross-stretch shown in FIGS. 3 and 6, respectively.

Figure 6:
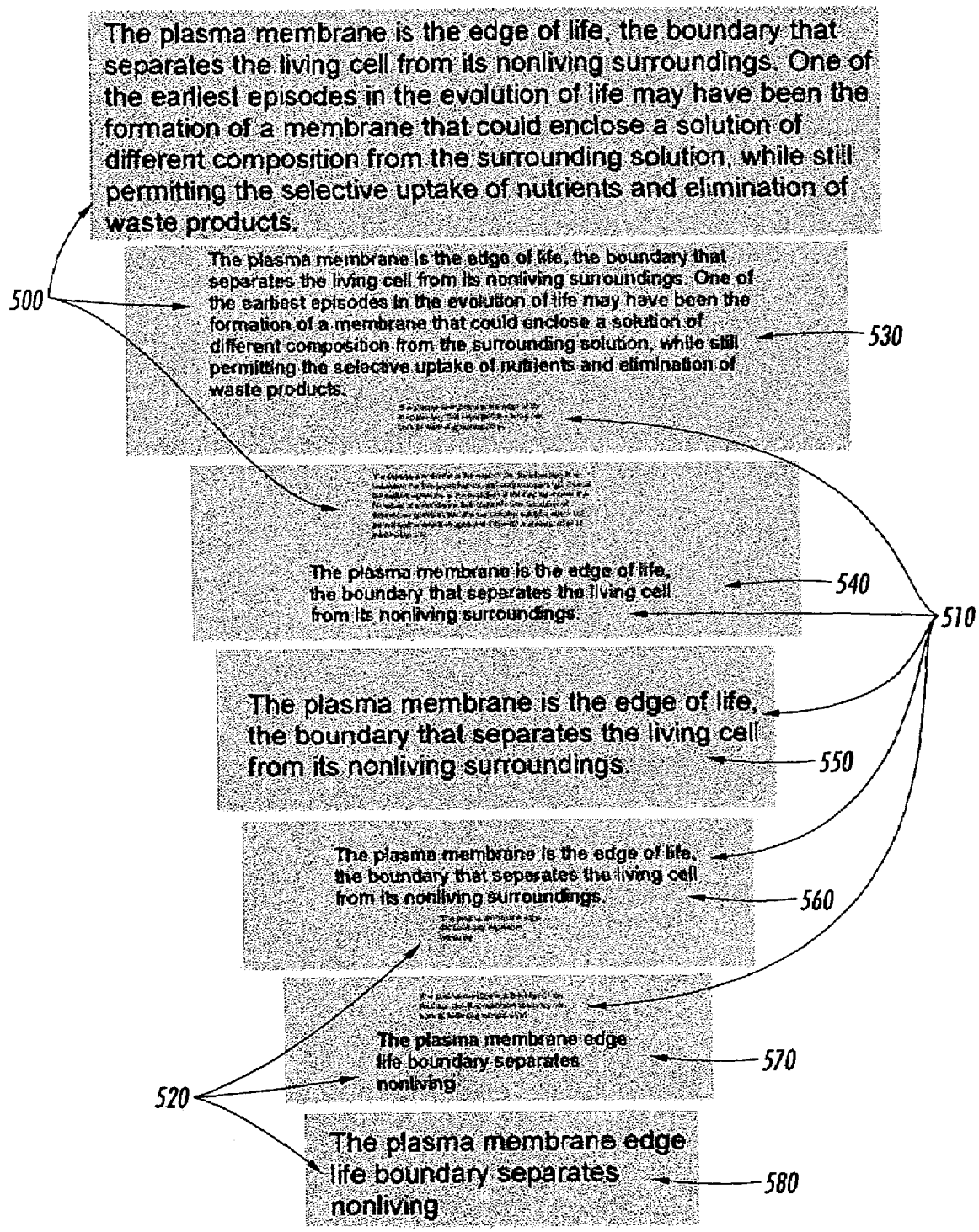
FIG. 6 illustrates an example of visualization used to present an incremental change in text representation according to this invention.

In the zooming example shown in FIG. 6, transitions between representations are animated to create a sense of continuity of identity. That is, each representation "morphs" into the next one. In this example, a cross-dissolve is used to animate the transition. During zooming out (when objects shrink), each text representation shrinks continuously in size until it is no longer legible within the shrinking allocated space. Then, the display shifts down to the next representation using an animated transition.

FIG. 6 shows an initial paragraph 500 and six stages of successive reduction of the paragraph 500. As shown in FIG. 6, this exemplary simulated text zooming visualization uses a cross stretch transition. Here, the reduced text grows while the pre-reduction text smoothly shrinks. In the example shown in FIG. 6, the magnification of the paragraph 500 is gradually reduced through stages 530 and 540, as the first reduced version 510 of the paragraph 500 is gradually zoomed in (enlarged), until, in stage 550, only the first reduced version 510 appears. Then, through stages 560 and 570, the magnification of the first reduced version 510 is gradually reduced while the second reduced version 520 is incrementally zoomed in (enlarged), until, in stage 580, only the second reduced version 520 appears.

FIG. 7 demonstrates another exemplary transition in which the words to remain move into a new configuration, and the words to be removed shrink and disappear, between stages.

In FIG. 7, a transition uses animation, for example, to move and shrink words between stages of representation. When the original paragraph 600 is reduced, the selected sentence 610 is restructured for presentation while the non-selected sentence 620 incrementally shrinks and finally disappears from view, to form sentence 630 for the next stage. This process is repeated until only one word remains—the word "plasma" in this example. As with the other examples described above, the final word may be further reduced by, for example, removing vowels, double letters, and/or the like.

In the examples described above, the reduction may start automatically when the original sentence or sentences are entered, or manually by the user by, for example, clicking on the original text. If the reduction is manually initiated by the user, the reduction may converge towards a certain position, such as the position of the beginning or middle of the original sentence or paragraph, or the position at which the user clicked, as the reduction progresses.

After the original text has been reduced, the full original text may be retrieved, either directly or incrementally, by reversing the reduction process by, for example, the user clicking on the reduced representation. If desired, rather than retrieving the full original text, the user may retrieve one of the intermediate versions of the text created during the reduction. The intermediate version to be retrieved may be predetermined by the user or may be determined by using an indicator indicating the intermediate versions of the reduction and allowing the user to freely select the intermediate versions.

Figure 8:
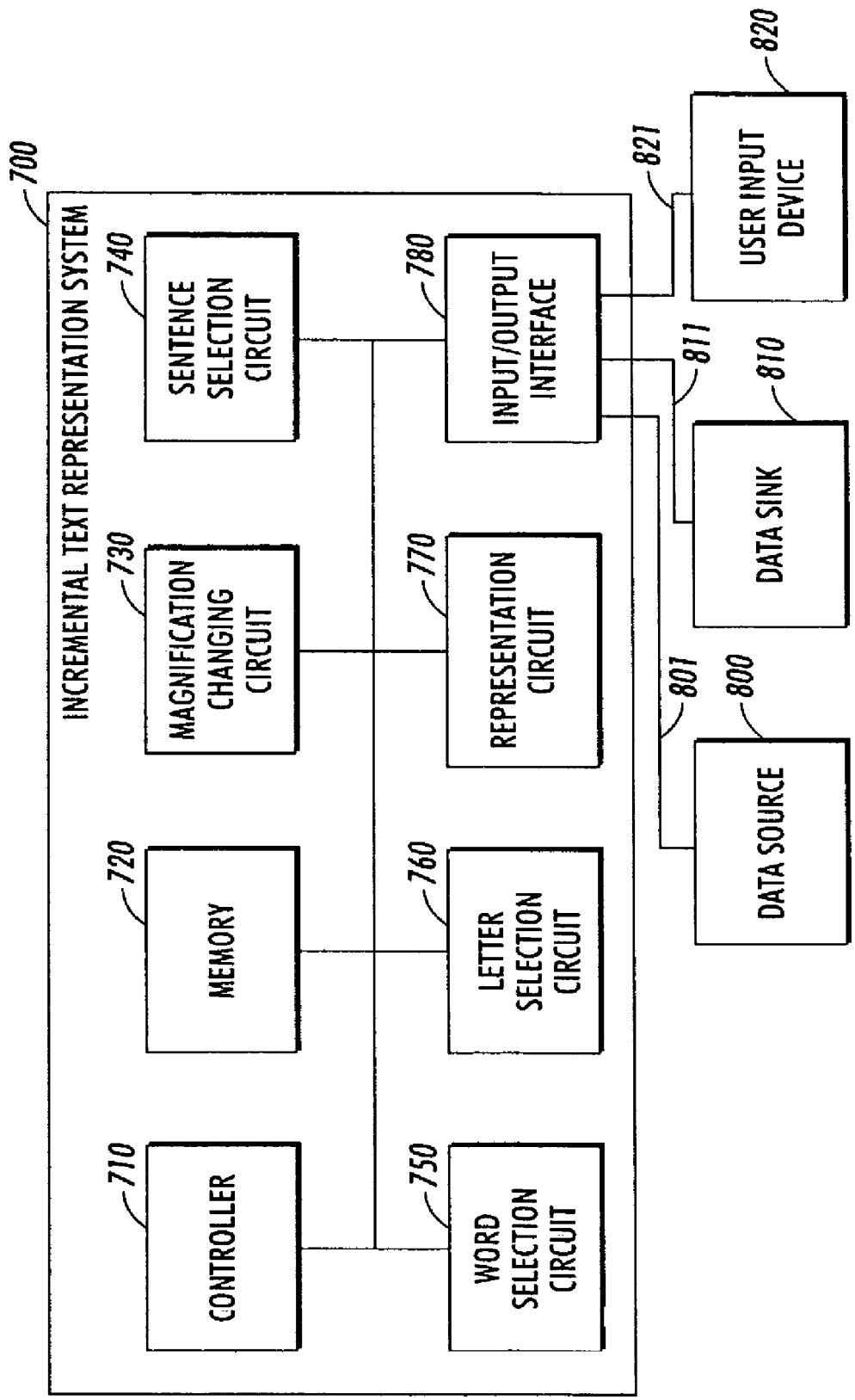
FIG. 8 is a block diagram of an exemplary incremental text representation system according to this invention.

FIG. 8 shows an exemplary embodiment of an incremental text representation system 700 according to this invention.

The incremental text representation system 700 includes a controller 710, a memory 720, a magnification changing circuit 730, a sentence selection circuit 740, a word selection circuit 750, a letter selection circuit 760, a representation circuit 770 and an input/output interface 780, which are interconnected via a communication link 790. The input/output interface 780 provides a connection between the incremental text representation system 700, and a data source 800, a data sink 810 and a user input device 820 via communication links 801, 811 and 821, respectively.

In general, the data source 800 can be any one of a number of different sources, such as a locally or remotely located computer sharing data, a scanner, or any other known or later-developed device that is capable of generating electronic data, such as a document. The data source 800 may also be a data carrier, such as a magnetic storage disc, CD-ROM or the like. Similarly, the data source 800 can be any suitable device that stores and/or transmits electronic media data, such as a client or a server of a network, intranet, or the Internet, and especially the World Wide Web. Moreover, the data source 800 can be any known or later developed source that is capable of providing palletized data to the incremental text representation system 700 of this invention. In embodiments, the data source 800 is a data storage device, and connected to the incremental text representation system 700 via the communication link 801.

The data sink 810 can be any known or later-developed device that is capable of outputting or storing the processed electronic media data generated using the apparatus and method according to this invention, such as a display device, a printer, a copier or other image forming device, a facsimile device, a memory or the like. In addition, the data sink 800 can be any known or later developed device that is capable of receiving the enhanced text data output by the incremental text representation system 700 and either storing, transmitting, or displaying the text data. In embodiments, the data sink 810 is a display device, and is connected to the incremental multi-level text reduction system 700 over the communication link 811.

The user input device 820 may be any known or later-developed device that is capable of inputting data and/or control commands to the incremental text representation system 700 via the communication link 821. The user input device 820 may include one or more of a keyboard, a mouse, a touch pen, a touch pad, a pointing device, or the like.

It will be appreciated that the data source 800, the data sink 810 and/or the user input device 820 may be incorporated into the same physical unit as the incremental multi-level text reduction system 700, or may be separate entities as shown.

The communication link 790 can be any known or later-developed device or system for connecting the controller 710, the memory 720, the magnification changing circuit 730, the sentence selection circuit 740, the word selection circuit 750, the letter selection circuit 760, the representation circuit 770, and the input/output interface 780. In addition, the communication links 801, 811 and 821 can be any known or later-developed devices or systems for connecting the data source 800, the data sink 810 and the user input device 820, respectively, to the incremental text representation system 600. These communication links 790, 801, 811 and 821 may be a direct cable or bus connection, a connection over a wide area network or local area network, a connection over an intranet, a connection over the Internet, or a connection over any other distributed processing network. Further, it should be appreciated that the communication links 790, 801, 811 and 821 can be wireless connections over a network. The network can be a local area network, a wide area network, an intranet, the Internet, or any other known or later-developed other distributed processing and storage network.

Data from the data source 800 may be scanned text of a physical document, data created electronically using any known or later developed programming language and/or computer software program, such as word processing software, and/or a spreadsheet shown in a spreadsheet program, or any other known or later developed text data source.

The controller 710 controls data flow between components of the incremental text representation system 700. The memory 720 may serve as a buffer for information coming into or going out of the incremental text representation system 700, may store any necessary programs and/or data for implementing the functions of the incremental text representation system 700, and/or may store other types of data, such as reduced text objects at various stages of processing. In embodiments, the memory 720 stores the original sentence or sentences to be reduced, and each stage of representation of the text.

Alterable portions of the memory 720 may be, in various exemplary embodiments, implemented using static or dynamic RAM. However, the memory 720 can also be implemented using a floppy disk and disk drive, a writable or rewritable optical disk and disk drive, a hard drive, flash memory or the like.

The magnification changing circuit 730 changes magnification of text data prior to and/or during each stage of representation. This may be done by, for example, reducing the letter size of sentences in the document by a predetermined percentage, such as about 30%, or to a predetermined size, such as a predetermined font size.

The sentence selection circuit 740 selects an appropriate number of sentences from a group of sentences. In various exemplary embodiments, the first sentence of the document may be selected. It will be apparent to those skilled in the art that other ways to select the sentence or sentences are possible. For example, the sentence selection circuit 740 may assign weights to each sentence of a text object using a known or later-developed weighting method, and select the sentence with the highest weighted source.

The word selection circuit 750 analyzes the sentence selected by the sentence selection circuit 740. Then, the word selection circuit 750 reduces the number of words by a predetermined percentage, such as about 50%, preferably using an algorithm, such as that described above, which select words by counting the number of letters used in the sentence, performing sentence analysis, and assigning a score. This operation is preferably repeated until there are only a predetermined number of words, such as one word, remaining.

The letter selection circuit 760 reduces the number of letters used in the remaining word or words. This may be done by, for example, eliminating non-stems and vowels or by determining whether there is any standard abbreviation for the remaining word.

The representation circuit 770 may present the sentences, words and letters to the user, while their reduction is being processed. The representation circuit 770 may be capable of implementing one or more animations, such as the above-described cross. dissolve transition, the above-described cross-stretch transition, and/or the like.

Moreover, it will be appreciated by those skilled in the art that, after an original text object has been reduced, the full original text may be retrieved, either directly or incrementally, by reversing the reduction process by, for example, the user clicking the current representation. That is, each stage of the reduction of the text object may be retrieved from the memory 720 in a reverse order. In other words, the most recent reduction of the text object is presented first. In addition, if desired, rather than retrieving the full original text, the user may retrieve one of the intermediate versions of the text created during the reduction. The intermediate versions to be retrieved may be predetermined by the user or may be determined by using an indicator indicating are allowed to select the intermediate versions of the reduction. During such retrieval of the text object, the representation circuit 770 can animate the retrieval of the text object at each level.

It should be appreciated that one or more of the devices/circuits described above and shown in FIG. 8 may be optional. For example, the magnification changing circuit 730 and the representation circuit 770 may be excluded from some embodiments.

Figure 9:
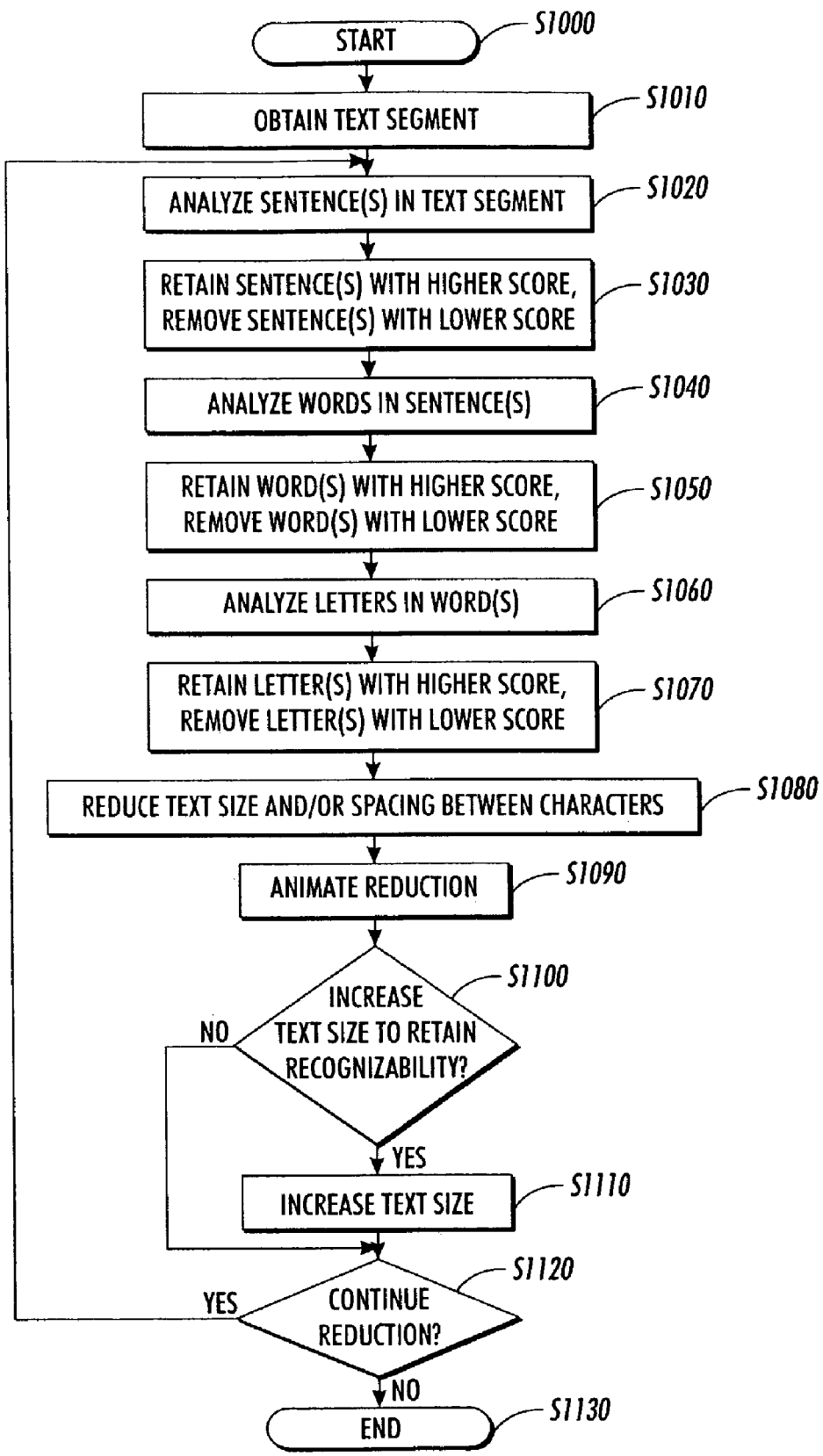
FIG. 9 is a flowchart showing an exemplary process for incrementally changing text representation.

FIG. 9 is a flowchart outlining one exemplary method for incrementally changing text representation. It should be appreciated that while various steps of the flowchart are shown as discrete and separate steps, many of the steps may be, and preferably are, carried out concurrently.

The process starts at step S1000 and continues to step S1010. In step S1010, a text segment is obtained. It should be appreciated that more than one text segment can be obtained, and that the process may operated on a plurality of independent text segments simultaneously or in sequence. Continuing to step S1020, the sentences of the text segment are analyzed based on one or more predetermined criteria, and in step S1030, one or more sentences with a higher score are retained, while one or more sentences with a lower score are removed.

Continuing to step S1040, words in the retained sentence(s) are analyzed based on one or more predetermined criteria, and the process continues to step S1050. In step S1050, one or more words with a higher score are retained, while one or more words with a lower score are removed. Continuing to step 1060, words in the retained word(s) are analyzed based on one or more predetermined criteria, and the process continues to step S1070. In step S1070, one or more letters with a higher score are retained, while one or more letters with a lower score are removed.

Continuing to step S1080, the text size and/or spacing between characters of the text is reduced. Continuing to step S1090, the text segment reduction is animated. Continuing to step S1100, the process determines whether to increase the size of text that has been previously reduced, or is targeted for subsequent reduction, in order to retain recognizability of the text. This determination may be made based on, for example, the current and/or expected font size of the text. For example, if the text is currently at a 12-point font size, it may be increased to an 18-point font size so that it is more recognizable, and/or so that, if it is subsequently reduced again, it will not decrease to a font size at which it is unrecognizable. It will be appreciated that this step is typically performed only at a point in the process at which some level of text reduction has already occurred, and is typically performed substantially simultaneously with elimination of a portion of the text segment, so that the net effect is that the overall size of the text segment decreases even though the size of the individual remaining characters is increased.

If "YES" is the result of the determination of step S1100, then the process continues to step S1110 and increases the text size, and then goes to step S1120. Otherwise, the process goes directly to step S1120.

In step S1120, a determination is made as to whether to continue the text reduction. If the reduction is to continue, the process returns to step S1020 and repeats steps S1020-S1120. Otherwise, the process continues step S1130 and ends.

It will be appreciated that, if there is only one sentence present at step S1020, then steps S1020 and S1030 maybe skipped.

It should be appreciated that the steps shown in FIG. 9 are described in the given order for illustration purposes, and in various exemplary embodiments, the steps may be performed in a different order, or concurrently with other steps. For example, the analysis and selection of sentences, words and/or letters may be performed concurrently. Moreover, additional or fewer steps may also be used to implement the invention. In embodiments, the animation step may be omitted. In other embodiments, the text size and/or spacing reduction may be omitted.

Those skilled in the art will recognize many applications for the present invention, including but not limited to display devices, such as systems that display applications of a personal computer, handheld devices, and the like. In short, the invention has application to any known or later developed system and device capable of selecting and incrementally changing the representation of text objects.

In the various exemplary embodiments outlined above, the incremental text representation system 700 can be implemented using a programmed general purpose computer. However, the system 700 can also be implemented using a special purpose computer, a programmed microprocessor or microcontroller and peripheral integrated circuit elements, and ASIC or other integrated circuit, a digital signal processor, a hardware electronic or logic circuit, such as a discrete element circuit, a programmable logic device, such as PLD, PLA, FPGA or PAL, or the like. In general, any device, capable of implementing a finite state machine that is in turn capable of implementing the flowcharts shown in FIG. 9, can be used to implement the system 700.

Each of the circuits or routines and elements of the various exemplary embodiments of the system 700 outlined above can be implemented as portions of a suitable programmed general purpose computer. Alternatively, each of the circuits and elements of the various exemplary embodiments of the system 700 outlined above can be implemented as physically distinct hardware circuits within an ASIC, or using FPGA, a PDL, a PLA or a PAL, or using discrete logic elements or discrete circuit elements. The particular form each of the circuits and elements of the various exemplary embodiments of the incremental multilevel text reduction system 700 outlined above will take is a design choice and will be obvious and predictable to those skilled in the art.

Moreover, the various exemplary embodiments of the system 700 outlined above and/or each of the various circuits and elements discussed above can each be implemented as software routines, managers or objects executing on a programmed general purpose computer, a special purpose computer, a microprocessor or the like. In this case, the various exemplary embodiments of the system 700 and/or each or the various circuits and elements discussed above can each be implemented as one or more routines embedded in the communication network, as a resource residing on a server, or the like. The various exemplary embodiments of the system 700 and the various circuits and elements discussed above can also be implemented by physically incorporating the system 700 into a software and/or hardware system, such as the hardware and software system of a web server or a client device.

While this invention has been described in conjunction with the exemplary embodiments outlined above, it is evident that many alternatives, modifications and variations will become apparent to those skilled in the art. Accordingly, the exemplary embodiments of the invention, as set forth above, are intended to be illustrative, not limiting. Various changes may be made without departing from the spirit and scope of the invention.

What is claimed is:

1. A method of incrementally reducing space required for representing a text object, comprising:
   obtaining a text segment;
   automatically analyzing a content of the text segment after obtaining the text segment without a user's designation of a criteria for reducing the space occupied by the text segment;
   reducing the space occupied by the text segment based on the analysis by successively displaying reduced representations of the text segment wherein each reduced representation uses less space than space occupied by an immediately preceding reduced representation; and
   enhancing recognizability of each reduced representation by displaying animation of a transition to an intermediate display where more than one representation is at least partially visible at the same time,
   wherein the reduced representations change a literal content of the text segment, and
   the analysis includes (1) whether words in the text segment are subject or predicate, (2) whether the words are a modifier, (3) how many letters are in each word, (4) how many times each word is repeated in a source document or selected portion of the document, (5) position of the words in the sentences, and (6) whether one or more letters of each word are capitalized.

2. The method of claim 1, wherein the reducing step includes reducing a number of words of the text segment.

3. The method of claim 1, wherein the reducing step includes reducing a number of letters in one or more words of the text segment.

4. The method of claim 3, wherein the letters are reduced by at least one of eliminating vowels, replacing the word with a predetermined abbreviation, replacing the word with a stem, replacing the word with an idiosyncratic spelling of the word, and eliminating double letters.

5. The method of claim 1, wherein the animation is one of a cross dissolve transition, a cross stretch transition, and shrinking and successive removal of the portions of the text segment.

6. A storage medium on which is recorded a program for implementing the method of claim 1.

7. An incremental text change representation system that incrementally reduces space required for representing a text segment, comprising:
   a controller; and
   a memory storing instructions for automatically analyzing a content of the text after receiving the text segment input by a user, without the user's designation of a criteria for reducing the space occupied by the text segment, reduces the space occupied by the text segment on a display device based on the analysis by successively displaying reduced representations of the text segment wherein each reduced representation uses less space than space occupied by an immediately preceding reduced representation and enhances recognizability of each reduced representation by display animation of a transition to an intermediate display where more than one representation is at least partially visible at the same time,
   wherein the reduced representations change a literal content of the text segment, and
   the analysis includes (1) whether words in the text segment are subject or predicate, (2) whether the words are a modifier, (3) how many letters are in each word, (4) how many times each word is repeated in a source document or selected portion of the document, (5) position of the words in the sentences, and (6) whether one or more letters of each word are capitalized.

8. The system of claim 7, wherein the reducing step includes reducing a number of words of the text segment.

9. The system of claim 7, wherein the reducing step includes reducing a number of letters in one or more words of the text segment.

10. The method of claim 9, wherein the letters are reduced by at least one of eliminating vowels, replacing the word with a predetermined abbreviation, replacing the word with a stem, replacing the word with an idiosyncratic spelling of the word, and eliminating double letters.

11. The system of claim 7, wherein the animation is one of a cross dissolve transition, a cross stretch transition, and shrinking and successive removal of the portions of the text segment.

12. The system of claim 7, in combination with a display device and a computer that contains the controller.

13. A method of incrementally reducing space required for representing a text object, comprising:
    obtaining a text segment;
    automatically analyzing a content of the text segment after obtaining the text segment without a user's designation of a criteria for reducing the space occupied by the text segment;
    reducing the space occupied by the text segment based on the analysis by successively displaying reduced representations of the text segment wherein each reduced representation uses less space than space occupied by an immediately preceding reduced representation; and
    enhancing recognizability of each reduced representation by successively shrinking a text font size to a smaller size, and then displaying animation to another representation with less text displayed at a restored larger font size,
    wherein the reduced representations change a literal content of the text segment, and
    the analysis includes (1) whether words in the text segment are subject or predicate, (2) whether the words are a modifier, (3) how many letters are in each word, (4) how many times each word is repeated in a source document or selected portion of the document, (5) position of the words in the sentences, and (6) whether one or more letters of each word are capitalized.

14. A method of incrementally reducing space required for representing a text object, comprising:
    obtaining a text segment;
    automatically analyzing a content of the text segment after obtaining the text segment without a user's designation of a criteria for reducing the space occupied by the text segment;
    reducing the space occupied by the text segment based on the analysis by successively displaying reduced representations of the text segment wherein each reduced representation uses less space than space occupied by an immediately preceding reduced representation; and
    enhancing recognizability of each reduced representation by selectively shrinking or fading a portion of the text segment that is being eliminated in the next representation of the displayed reduced representation,
    wherein the reduced representations change a literal content of the text segment, and
    the analysis includes (1) whether words in the text segment are subject or predicate, (2) whether the words are a modifier, (3) how many letters are in each word, (4) how many times each word is repeated in a source document or selected portion of the document, (5) position of the words in the sentences, and (6) whether one or more letters of each word are capitalized.

15. An incremental text change representation system that incrementally reduces space required for representing a text object, comprising:
    a controller;
    a memory storing instructions for automatically analyzing a content of the text object, after obtaining the text object input by a user, without the user's designation of a criteria for reducing the space occupied by the text object, reduces the space occupied by the text object based on the analysis by successively displaying reduced representations of the text segment wherein each reduced representation uses less space than space occupied by an immediately preceding reduced representation and enhances recognizability of each reduced representation by successively shrinking a text font size to a smaller size, and then displaying animation to another representation with less text displayed at a restored larger font size; and
    a display device that outputs the reduced representation,
    wherein the reduced representations change a literal content of the text segment, and
    the analysis includes (1) whether words in the text segment are subject or predicate, (2) whether the words are a modifier, (3) how many letters are in each word, (4) how many times each word is repeated in a source document or selected portion of the document, (5) position of the words in the sentences, and (6) whether one or more letters of each word are capitalized.

16. An incremental text change representation system that incrementally reduces space required for representing a text object, comprising:
    a controller;
    a memory storing instructions for automatically analyzing a content of the text object, after obtaining the text object input by a user, without the user's designation of a criteria for reducing the space occupied by the text object, reduces the space occupied by the text object based on the analysis by successively displaying reduced representations of the text segment wherein each reduced representation uses less space than space occupied by an immediately preceding reduced representation and enhances recognizability of each reduced representation by selectively shrinking or fading a portion of the text object that is being eliminated in the next representation of the displayed reduced representation; and
    a display device that outputs the reduced representation,
    wherein the reduced representations change a literal content of the text segment, and
    the analysis includes (1) whether words in the text segment are subject or predicate, (2) whether the words are a modifier, (3) how many letters are in each word, (4) how many times each word is repeated in a source document or selected portion of the document, (5) position of the words in the sentences, and (6) whether one or more letters of each word are capitalized.

* * * * *